United States Patent [19]

Beal

[11] 4,451,541

[45] May 29, 1984

[54] SOLDERING COMPOSITION AND METHOD OF USE

[75] Inventor: Roy E. Beal, Naperville, Ill.

[73] Assignee: Copper Development Association, Inc., Birmingham, Mich.

[21] Appl. No.: 456,517

[22] Filed: Jan. 7, 1983

Related U.S. Application Data

[63] Continuation of Ser. No. 193,596, Sep. 30, 1983, abandoned, which is a continuation-in-part of Ser. No. 97,950, Nov. 28, 1979, abandoned, which is a continuation-in-part of Ser. No. 24,001, Mar. 26, 1979, abandoned.

[51] Int. Cl.$^3$ ...................... B23K 35/28; B32B 15/01
[52] U.S. Cl. .................................... 428/658; 228/110; 228/220; 228/263.11; 228/263.18; 420/524; 420/521; 428/674
[58] Field of Search ............... 420/524, 521, 522, 515, 420/516; 428/658, 674; 228/220, 263.11, 263.16, 263.18, 110

[56] References Cited

U.S. PATENT DOCUMENTS

| 390,972 | 10/1888 | Huryich . | |
|---|---|---|---|
| 972,786 | 11/1909 | Stratton . | |
| 2,222,157 | 11/1940 | Ruzicka | 420/519 |
| 2,254,598 | 9/1941 | Dean . | |
| 2,412,045 | 12/1946 | Harrington | 420/521 |
| 2,472,402 | 6/1949 | Boyle | 420/521 |
| 3,684,496 | 8/1972 | Tanaka et al. | 420/516 |
| 3,837,819 | 9/1974 | Hibbs, Jr. | 428/658 |
| 4,115,604 | 9/1978 | Bernstein . | |
| 4,168,972 | 9/1979 | Dreulle . | |

FOREIGN PATENT DOCUMENTS

| 3335 | 6/1943 | Japan . |
| 5873 | of 1882 | United Kingdom . |
| 629425 | 9/1945 | United Kingdom . |
| 747813 | 4/1956 | United Kingdom . |

Primary Examiner—Kenneth J. Ramsey
Attorney, Agent, or Firm—Leydig, Voit, Osann, Mayer & Holt, Ltd.

[57] ABSTRACT

A zinc-based composition comprising from 0.01 to 5 percent lead and 0.01 to 20 percent tin, preferably minor amounts of chromium and/or titanium and/or nickel and with the balance being zinc is provided. A minor amount of copper may also be present. The composition is particularly useful for joining copper and copper alloys because it will wet and readily flow on the copper or copper alloy surfaces. It can be used with or without a flux. It has reduced dissolving action on the copper and copper alloys due to its reduced reactivity with them. It also has improved conductivity vis-a-vis conventional lead-tin and lead-tin-silver solders.

20 Claims, No Drawings

SOLDERING COMPOSITION AND METHOD OF USE

This application is a continuation of U.S. application Ser. No. 193,596 filed Sept. 30, 1983 (now abandoned) which in turn is a continuation-in-part of U.S. application Ser. No. 097,950 filed Nov. 28, 1979 (now abandoned) which in turn is a continuation-in-part of U.S. application Ser. No. 024,001, filed Mar. 26, 1979 (now abandoned).

BACKGROUND OF THE INVENTION

1. Field of the Invention

Traditionally, copper and copper alloys have been soldered or joined with lead-tin or lead-tin-silver solders. The high cost and density of these types of solders—which are used extensively in automobile and truck radiators—has to some extent limited their use and has encouraged the search for suitable alternatives. A further drawback is their limited mechanical strength which decreases as the temperature rises.

An object of this invention is to provide an alternative to these conventional solders which is highly effective in joining copper and copper alloys, which is reasonable in cost and which maintains its strength over a wide range of temperatures. Additionally, the compositions provided by this invention readily wet and flow over copper and copper alloy surfaces during the joining operation and have reduced dissolving activity or reactivity—vis-a-vis conventional zinc alloys.

2. Description of Prior Art

High zinc content metallic rods for welding brass and similar alloys have been previously disclosed. For example, U.S. Pat. No. 2,114,781 relates to metallic rods used for the welding of brass and similar alloys which have a high percentage of zinc and a comparatively low melting point. Typical of the welding rods disclosed in that patent is one having the following composition:

| Component | Percent |
|---|---|
| Zinc | 54.2 |
| Copper | 41.0 |
| Nickel & Cobalt | 4.5 |
| Silicon | 0.3 |

A somewhat related composition useful for soldering and brazing cast iron is disclosed in U.S. Pat. No. 3,516,825 wherein a solder consisting of 48–50% copper, 0.8–1.0% tin, 9.5–10.5% manganese, 3.5–4.5% nickel, 0.15–0.25% aluminum, and the remainder zinc is set out. This patent also discloses a prior art composition comprised of 38–50% zinc, 1% iron, 1% tin, 0.5% manganese, and the balance copper.

U.S. Pat. No. 3,684,946 discloses a soft solder having improved strength at elevated temperatures. The solder consists of 0.5–7% silver, 0.5–2.5% copper, 0.05–2% chromium, and/or 0.05–1% nickel, preferably 0.1–2% aluminum and 0.01–0.3% magnesium and the balance zinc.

U.S. Pat. No. 2,167,678 discloses a metal alloy intended for use as a solder consisting of the following materials:

| Component | Percent |
|---|---|
| Zinc | 42.0 |
| Lead | 23.0 |
| Tin | 22.0 |
| Bismuth | 10.0 |
| Cadmium | 2.95 |
| Silver | 0.05 |

U.S. Pat. No. 3,591,368 discloses a copper based alloy useful at high temperatures and comprised of 38–43% zinc, 5–15% nickel, 0.1–1.0% chromium, 0.3% or less titanium, 0–0.5% silicon, 0% to not more than 0.5% lead, and the balance copper.

U.S. Pat. No. 2,837,427 discloses a specific composition for use in making jewelry comprising 70% zinc, 10% tin and 20% lead.

U.S. Pat. No. 1,333,237 discloses a soldering substance composed essentially of zinc, tin and lead in the following proportions:

| Component | Percent |
|---|---|
| Zinc | From 20 to 70 |
| Tin | From 15 to 60 |
| Lead | From 10 to 50 |

This composition described as a "soldering substance" is described as useful for soldering aluminum.

U.S. Pat. No. 2,254,598 discloses alloys capable of being hot pressed or extruded and valuable for the fabrication of valve bodies, gears, pinions, spuds and other parts which are "at present" made from hot pressed brass. The alloys are described as falling within the general range of about 2 to about 15% copper, about 50 to about 75% zinc, and the balance substantially manganese, in each case, however, the manganese being present in amounts at least equal to, and preferably substantially greater than, the copper. Small proportions, for example, up to about 5% of other alloying constituents such as lead or tin can also be utilized in compositions of this alloy where "special characteristics are desired, such as increased machinability or frictional resistance, but, in general, the alloys contain substantially only copper, zinc and manganese, such other elements as are present being introduced only as impurities." (Page 1, col. 1, lines 35–53).

U.S. Pat. No. 2,360,784 discloses metal coating compositions for producing "galvanized" coatings on a ferrous metal base. The compositions disclosed are alloys containing minor amounts of copper and titanium with the balance being zinc. According to the patent, these materials were developed to provide an alternative to what was apparently at the time, the general practice of hot dip zinc coating where metallic tin had been used in the molten coating bath. The scarcity of tin is the stated reason for developing alternative products for carrying out this galvanizing process.

U.S. Pat. No. 3,527,601 discloses a zinc-base alloy article in which at least one additive metal from a list set forth at column 2, lines 39–53 of "operable additive metals" is included. The additive metals disclosed include 1.5 to 5.0% copper, 0.005 to 1.0% chromium, and 0.01 to 1.0% titanium.

U.S. Pat. No. 2,472,402 discloses zinc-base alloys containing from 0.5 to 1.5% copper, from 0.12 to 0.5% titanium and the balance zinc. Commercial roll zinc is also described as useful. According to the patent, commercial roll zinc may contain, for example, 0.10% lead, 0.012% iron and 0.005% cadmium.

An article by A. Passerone titled "Interfacial Tensions in Zn, Zn—Sn and Zn—Sn—Pb Systems" appearing in the *Journal of the Less Common Metals*, 52 (1977) 37–49 appears to disclose alloys containing 7% tin, 7% lead, and the balance zinc. The reference discusses the interfacial tension of alloys subjected to metallurgical processes.

U.K. Pat. No. 629,425 discloses a soft solder alloy for aluminum and aluminum alloys having the formula: zinc 65-92%, tin 2-25%, lead 1-3%, copper 2.5-4.5%, and aluminum 2-8%. The alloy is taught as useful in soldering sheeting of aluminum and its alloys.

U.K. Pat. No. 747,813 discloses flux compositions for use with a range of solders. Included as solder composition IV is the following:

| Component | Percent |
|---|---|
| Zinc | 0 to 50 |
| Lead | 0 to 50 |
| Cadmium | 0 to 20 |
| Silver | 0 to 20 |
| Antimony | 0 to 10 |
| Tin | Balance |

There may also be included within this solder from 0.25 to 5% by weight of each of such of the elements sodium, manganese, nickel, antimony, bismuth, or silicon and from 0.25 to 9% by weight of each of such of the metals tin, copper or lead, singly or together, as are not already contained therein in accordance with the composition IV above.

SUMMARY OF THE INVENTION

The subject invention is directed to a zinc-based composition comprised of from 0 to about 3% chromium, 0 to about 3% titanium, 0 to about 5% nickel, 0 to about 3% copper, about 0.01 to about 5% lead, about 0.01 to 20% tin, and the balance zinc. The compositions of the subject invention are particularly useful for soldering or joining copper or copper alloy surfaces, such as those used in automobile and truck radiators. They also find use in joining copper or copper alloy surfaces in electrical motors and generators and in electronic modules such as printed circuits. The zinc-based compositions of the subject invention are substantially more economical than the conventional lead-tin and lead-tin-silver solders, have good wetting and spreading characteristics on the copper or copper alloy surfaces, relatively low dissolving activity or reactivity with the copper or copper alloy interfaces being joined and improved conductivity with concomitant improved characteristics in electrical circuitry.

The subject invention is also directed to a process for utilizing the above-described zinc-based composition to join copper and copper based alloys and to the article of manufacture resulting from the joining of a plurality of copper or copper alloy surfaces with the subject soldering composition. In this regard, the zinc-based composition may be used in conventional fabricated forms such as a rod or wire when used with fluxes or in ingot from when it is to be used, e.g., in molten form in the ultrasonic soldering of copper or copper alloy surfaces. It may also be used in particulate form as well as other fabricated forms such as foil, sheet or ribbon form and the like. In joining or soldering copper and copper alloy surfaces, the composition of this invention may be used with conventional or specifically developed fluxes. With proper techniques, no flux of any type is required. For example, if ultrasonic soldering techniques are used, no flux of any type is required.

It is also, of course, possible to use the composition of the subject invention as a surfacing alloy, i.e., a single copper or copper alloy surface may be bonded to the zinc-based composition of this invention.

DESCRIPTION OF THE PREFERRED EMBODIMENT

The compositions of the subject invention as outlined above have particular use in the joining or soldering of copper or copper alloy structures, e.g., radiators; in joining copper or copper alloy surfaces in electrical motors and generators; and in electronic modules such as printed circuits.

The zinc-based compositions of the subject invention have as basic components lead, tin and a major proportion of zinc. Additionally, the compositions of the subject invention preferably also contain chromium and/or titanium and/or nickel which enhance the properties of the subject compositions as outlined above, particularly in reducing the reactivity of the compositions with the copper or copper alloy interfaces. A minor amount of copper may also be present to assist in reducing the reactivity of the composition with the copper or copper alloy interfaces. Ranges on the materials useful in the new soldering compositions of the subject invention are as follows:

| Component | Percent |
|---|---|
| Chromium | 0–3.0 |
| Copper | 0–3.0 |
| Lead | 0.01–5 |
| Nickel | 0–5.0 |
| Tin | 0.01–20 |
| Titanium | 0–3.0 |
| Zinc | Balance |

Chromium, when present, is preferably present in an amount from about 0.3 to about 1% and most preferably about 0.5%; titanium, when present, is preferably present in an amount from about 0.3 to about 1% and most preferably about 0.5%; nickel, when present, is preferably present in an amount of from about 0.3 to about 1% and most preferably about 0.5%; preferably, the lead is present in an amount of from about 0.1 to about 3% and most preferably about 1%; preferably, the tin is present in an amount of from 0.1 to about 15%, more preferably from about 3 to about 10%, and for repair solder work, preferably about 9 to about 10%, and for original construction about 3 to about 5%. Copper, when present, is preferably present in an amount of from about 0.1 to about 3%, more preferably about 1%.

All percentages used herein are weight percentages. All parts are by weight and based on 100 total parts of the final composition.

The compositions of the subject invention should not contain manganese in more than very minor amounts, preferably no more than trace amounts. Manganese, if present in a significant amount, i.e., 1% or more, detracts from the desirable characteristics of the compositions of the subject invention by reducing oxidation resistance and wetting properties of the alloys. Small amounts of manganese will not detract from the performance of the compositions of this invention. To the extent that any of the metals used in preparing the compositions of this invention contain minor amounts of manganese, this is not deleterious provided that the total amount of manganese is less than 1%.

Similarly, the zinc-based compositions of this invention should not contain aluminum in more than very minor amounts, preferably no more than trace amounts. Aluminum, if present in a significant amount detracts from the desirable characteristics of the compositions of the subject invention by reducing the flow, wetting and joining characteristics of the solder, on copper and copper alloy surfaces.

The compositions of this invention should not contain cadmium, indeed any present as even trace impurities should preferably be eliminated, to the extent feasible, because of the strongly toxic nature of this metal. The compositions of this invention should be essentially free of cadmium.

The fluxes used with the compositions of the subject invention typically will contain a halide, e.g., a bromide or a chloride as an acid or a salt. Iron, silver or tin may also be present in the flux either as fine particles of the elemental metal or as soluble salts such as chlorides, nitrates, bromides, etc. An example of a useful flux is 5 parts concentrated hydrochloric acid, 5 parts ammonium chloride in 90 parts of a water solution saturated with silver chloride. Higher concentrations, such as 10 parts concentrated hydrochloric acid, 10 parts ammonium chloride in 80 parts of a water solution saturated with silver chloride are particularly useful for carrying out repair work with the zinc-based solder compositions of this invention.

The compositions of the subject invention can be prepared by a straightforward melting operation. Preferably, induction melting is used because it provides improved mixing. The melting operation is also preferably carried out under an inert atmosphere, e.g., a nitrogen or argon blanket, to avoid oxidation of the component metals, particularly titanium. A nominal temperature in the range of from about 850° to 1200° F. is typically reached during the melting operation; preferably the higher temperatures in this range are used to expedite melting and mixing of the components.

The zinc-based compositions of this invention can be used to join copper or copper alloys using conventional soldering techniques and conventional fluxes, as well as the fluxes described above. The composition of this invention can also be used in the absence of any flux. For example, a molten bath of a composition of this invention can be prepared and copper or copper alloys joined by placing them in the bath in close proximity and applying an ultrasonic field. Ultrasonic cavitation in the molten composition removes oxide from the parts and allows the composition to coat the clean surfaces.

Similarly, copper or copper alloy surfaces can be joined without the use of a flux by placing the zinc-based composition of the subject invention between the surfaces, to be joined—e.g., as a sheet, ribbon, foil, ring or preform—and in contact therewith. The zinc-based composition is then heated to melt it and allow it to wet the surfaces. Upon cooling, a solid joint with substantial strength is formed. When this procedure is used, the heating step is carried out under a reducing atmosphere, e.g., a nitrogen gas blanket containing a minor amount of (e.g., 5%) hydrogen. Additionally, the inert gas should have a low dewpoint, i.e., a low water vapor content.

The following examples are illustrative of the present invention and are not intended as a limitation upon the scope thereof. While the invention is susceptible of various modifications and alternative forms, specific embodiments thereof will hereinafter be described in detail. It should be understood that it is not intended to limit the invention to the particular forms disclosed, but, on the contrary, the invention is to cover all modifications, equivalents and alternatives falling within the spirit and scope of the invention as expressed in the appended claims. For example, commercial grade metals may for certain uses, e.g., joining radiator parts, be perfectly satisfactory. However, for applications where high and uniform conductivity is important, it may be necessary to utilize more highly refined and purified metals in preparing the compositions of the subject invention.

It should also be noted that an additional advantage of the compositions of this invention is that they are compatible with and produce strong joints with conventional lead-tin or lead-tin-silver solders. Additionally, it is possible to incorporate certain metal components, e.g., iron, silver and/or tin, into the flux to provide additional enhancement of the wetting characteristics of the compositions of this invention.

EXAMPLES

Example 1

A zinc-based alloy useful as a solder for joining or soldering copper or copper alloys is prepared as follows:

0.5 parts chromium, 0.5 parts titanium, 1 part lead, 5 parts tin and 93 parts zinc are placed in a vessel in an induction furnace under an argon blanket and heated to about 900° F. The resulting composition has a tensile strength of 11,000 pounds per square inch and a melting temperature of 745° F. When used as a solder with an appropriate flux to join copper alloy surfaces, a high strength bond was formed.

Example 2

A zinc-based alloy useful as a solder for joining or soldering copper or copper alloys is prepared as follows:

0.5 parts chromium, 0.5 parts titanium, 1 part lead, 9 parts tin and 89 parts zinc are placed in a vessel in an induction furnace under an argon blanket and heated to about 900° F. The resulting composition has a tensile strength of 12,000 pounds per square inch and a melting temperature of 745° F. When used as a solder with an appropriate flux to join copper alloy surfaces, a high strength bond was formed.

Example 3

A zinc-based alloy useful as a solder for joining or soldering copper or copper alloys is prepared as follows:

0.5 parts chromium, 0.5 parts titanium, 1 part lead, 15 parts tin and 83 parts zinc are placed in a vessel in an induction furnace under an argon blanket and heated to about 900° F. The resulting composition has a tensile strength of 14,000 pounds per square inch and a melting temperature of 735° F. When used as a solder with an appropriate flux to join copper alloy surfaces, a high strength bond was formed.

Example 4

A zinc-based alloy useful as a solder for joining or soldering copper or copper alloys is prepared as follows:

1 part chromium, 1 part copper, 9 parts tin, 1 part lead and 88 parts zinc are placed in a vessel in an induction furnace under an argon blanket and heated to about 900° F. The resulting composition has a tensile strength of 14,000 pounds per square inch and a melting temperature of 745° F. When used as a solder with an appropriate flux to join copper alloy surfaces, a high strength bond was formed.

Example 5

A zinc-based alloy useful as a solder for joining or soldering copper or copper alloys is prepared as follows:

0.5 parts chromium, 0.5 parts nickel, 1 part lead, 9 parts tin and 89 parts zinc are placed in a vessel in an induction furnace under an argon blanket and heated to about 900° F. The resulting composition has a tensile strength of 12,000 pounds per square inch and a melting temperature of 730° F. When used as a solder with an appropriate flux to join copper alloy surfaces, a high strength bond was formed.

Example 6

A zinc-based alloy useful as a solder for joining or soldering copper or copper alloy surfaces is prepared as follows:

0.4 parts chromium, 0.4 parts titanium, 1 part lead, 9 parts tin and 89.2 parts zinc are placed in a vessel in an induction furnace under an argon blanket and heated to about 900° F. The resulting composition has a tensile strength of about 12,000 pounds per square inch and a melting temperature of about 750° F.

Example 7

In the absence of any flux, the composition of Example 6 was heated to about 850° F. to form a molten solder bath in a Blackstone TP-3 ultrasonic tinning pot with integral ultrasonic generator. Two brass strips (of conventional grade for use in radiators) about 3 inches long, about 0.375 inches wide and about 0.005 inches thick were dipped in the molten solder bath while being held in alignment with their flat sides parallel to each other and about 1/32 to about 1/16 inch apart. An ultrasonic field was then applied to the molten solder bath. After a period of about 15 seconds, the molten solder bath had successfully wetted the surfaces of the brass strips and upon removal the molten solder between the strips solidified forming a solid joint with substantial strength.

Times of from about 15 seconds up to about two minutes have been successfully used in joining copper alloy surfaces using the ultrasonic technique described above.

Example 8

Flattened brass tubes (of about ½ inch by about ⅛ inch) conventionally used in radiator assembly were coated with the zinc-based composition of Example 6 by dipping them in a molten bath of the composition. The coated brass tubes were then allowed to cool thereby forming a thin coat of the zinc-based composition over their outer surface. Copper radiator fins were then placed in contact with the coated brass tubes and heated to about 850° F. in a reducing atmosphere (nitrogen with 5% hydrogen) thereby melting the zinc-based coating on the exterior of the brass tubes. The melted coating flowed by capillary action to the points of contact between the brass tubes and the copper fins. Upon cooling, solid joints of substantial strength were formed.

I claim as my invention:

1. A zinc-based composition useful for soldering or joining copper or copper alloy surfaces comprising from 0 to about 3.0% copper, from about 0.3 to about 3.0% chromium, from about 0.3 to about 3.0% titanium, from 0 to about 5.0% nickel, from about 0.01 to about 1.0% lead, from about 0.01 to about 20% tin, and the balance zinc, said composition being essentially free of cadmium and containing less than 1% manganese and no more than very minor amounts of aluminum.

2. The composition of claim 1 wherein said tin is present in an amount of from about 3 to about 10%.

3. The composition of claim 2 wherein said lead is present in an amount of from about 0.1 to about 1.0%.

4. The composition of claim 3 wherein said chromium is present in an amount of from about 0.3 to about 1.0% and said titanium is present in an amount of from about 0.3 to about 1.0%.

5. The composition of claim 4 wherein said chromium is present in an amount of about 0.5%, said titanium is present in an amount of about 0.5%, said lead is present in an amount of about 1.0%, and said tin is present in an amount of about 9%.

6. The composition of claim 4 wherein said chromium is present in an amount of about 0.5%, said titanium is present in an amount of about 0.5%, said lead is present in an amount of about 1.0%, and said tin is present in an amount of about 5%.

7. The composition of claim 1 in the form of a fabricated product.

8. The composition of claim 1 in the form of a rod or wire.

9. An article of manufacture comprising a plurality of copper or copper alloy surfaces joined by a zinc-based composition as the soldering material comprised of from 0 to about 3.0% copper, 0 to about 3.0% chromium, 0 to about 3.0% titanium, 0 to about 5.0% nickel, from about 0.01 to about 5.0% lead, from about 0.01 to about 20% tin and the balance zinc.

10. The article of manufacture of claim 9 wherein said zinc-based composition further comprises from about 0.3 to about 3.0% chromium, from about 0.3 to about 3.0% titanium, from about 0.01 to about 1.0% lead and from about 3 to about 10% tin.

11. An article of manufacture comprising a copper or copper alloy surface to which has been joined a zinc-based composition comprised of from 0 to about 3.0% copper, from about 0.3 to about 3.0% chromium, from about 0.3 to about 3.0% titanium, from 0 to about 5.0% nickel, from about 0.01 to about 1.0% lead, from about 0.01 to about 20% tin and the balance zinc as a surfacing alloy, said composition being essentially free of cadmium and containing less than 1% manganese and no more than very minor amounts of aluminum.

12. A method for joining copper or copper alloy surfaces comprising soldering or joining said surfaces together utilizing a zinc-based composition comprising from 0 to about 3.0% copper, from 0 to about 3.0% chromium, from 0 to about 3.0% titanium, from 0 to about 5.0% nickel, from about 0.01 to about 5.0% lead, from about 0.01 to about 20% tin and the balance zinc.

13. The method of claim 12 wherein said method is carried out in the absence of flux using an ultrasonic field.

14. The method of claim 12 wherein said method is carried out in the absence of a flux under a reducing atmosphere.

15. The method of claim 12 wherein said method is carried out using a flux.

16. The method of claim 12 wherein said tin is present in an amount of from about 0.1 to about 15%.

17. The method of claim 12 wherein said tin is present in an amount of from about 3 to about 10%.

18. The method of claim 12 wherein said lead is present in an amount of from about 0.1 to about 1%.

19. The method of claim 12 wherein said chromium is present in an amount of about 0.5%, said titanium is present in an amount of about 0.5%, said lead is present in an amount of about 1.0%, and said tin is present in an amount of about 5%.

20. The method of claim 12 wherein said chromium is present in an amount of about 0.5%, said titanium is present in an amount of about 0.5%, said lead is present in an amount of about 1.0%, and said tin is present in an amount of about 9%.

* * * * *